United States Patent
Teferi

(10) Patent No.: US 12,493,575 B2
(45) Date of Patent: Dec. 9, 2025

(54) BACKOFF TIMER FOR IN-BAND INTERRUPT ON AN I3C BUS

(71) Applicant: STMicroelectronics International N.V., Geneva (CH)

(72) Inventor: Eyuel Zewdu Teferi, Milan (IT)

(73) Assignee: STMicroelectronics International N.V., Geneva (CH)

( * ) Notice: Subject to any disclaimer, the term of this patent is extended or adjusted under 35 U.S.C. 154(b) by 93 days.

(21) Appl. No.: 18/513,885

(22) Filed: Nov. 20, 2023

(65) Prior Publication Data
US 2025/0165428 A1  May 22, 2025

(51) Int. Cl.
G06F 13/42 (2006.01)

(52) U.S. Cl.
CPC .............. G06F 13/4282 (2013.01)

(58) Field of Classification Search
None
See application file for complete search history.

(56) References Cited

U.S. PATENT DOCUMENTS

| | | | |
|---|---|---|---|
| 11,144,486 B2 | 10/2021 | Bhavsar et al. | |
| 2010/0172369 A1* | 7/2010 | Ohmi | H04L 12/413 |
| | | | 370/445 |
| 2016/0147684 A1 | 5/2016 | Sengoku | |
| 2018/0224887 A1 | 8/2018 | Pitigoi-Aron | |
| 2019/0138490 A1 | 5/2019 | Srivastava | |
| 2019/0302830 A1 | 10/2019 | Chen et al. | |
| 2020/0012612 A1 | 1/2020 | Takahashi et al. | |
| 2020/0073833 A1* | 3/2020 | Graif | G06F 13/24 |
| 2020/0089632 A1 | 3/2020 | Graif et al. | |
| 2021/0026796 A1 | 1/2021 | Graif et al. | |
| 2021/0271628 A1 | 9/2021 | Chin et al. | |

\* cited by examiner

Primary Examiner — Farley Abad
Assistant Examiner — Dayton Lewis-Taylor
(74) Attorney, Agent, or Firm — Crowe & Dunlevy LLC

(57) ABSTRACT

A process for a slave device on a serial data bus to make an in-band interrupt request to a master device includes checking whether a backoff time stored by a backoff timer has expired. When the backoff time has not expired, the slave device refrains from initiating the in-band interrupt request to the master device in response to a start condition on the serial bus. However, when the backoff time has expired, the slave device is permitted to initiate the in-band interrupt request to the master device in response to the start condition on the serial bus.

22 Claims, 3 Drawing Sheets

BACKOFF TIMER FOR IN-BAND INTERRUPT ON AN I3C BUS

TECHNICAL FIELD

The present invention relates to the servicing of in-band interrupts (IBI) on an I3C bus and, in particular, to a process for addressing starvation of service to lower priority slave devices.

BACKGROUND

It well known to employ a serial bus to interconnect devices for data communications. For example, a processor or other host device may be connected to peripheral devices via a serial bus. This serial bus is typically operated in accordance with specifications and protocols defined by a standards body. In an example, the I3C protocols define timing relationships between signals and transmissions on the serial bus.

I3C slave (target) devices are configured to assert an in-band interrupt (IBI) to request access to the serial bus. The bus master (controller) device services the requested interrupts on a priority basis. In cases of contention for service among multiple slave devices, the interrupt-asserting slave device having the highest assigned priority is serviced first. Because of this priority-based servicing hierarchy, a slave device with a lower priority may be starved of service when higher priority slave devices compete for bus access at every interrupt opportunity.

There is accordingly a need in the art to address the foregoing problem and ensure that lower priority I3C slave devices are given opportunities to have their interrupt requests serviced by the bus master device.

SUMMARY

In an embodiment, a process for a slave device on a serial data bus to make an in-band interrupt request to a master device comprises: checking whether a backoff time stored by a backoff timer has expired; when the backoff time has not expired, refraining from initiating the in-band interrupt request to the master device in response to a start condition on the serial bus; and when the backoff time has expired, permitting initiating the in-band interrupt request to the master device in response to the start condition on the serial bus.

In an embodiment, a slave device configured for communication with a master device over a serial data bus comprises: a backoff timer configured to store a backoff time; wherein the slave device is further configured to: check whether the backoff time stored by the backoff timer has expired; when the backoff time has not expired, refrain from initiating an in-band interrupt request to the master device in response to a start condition on the serial bus; and when the backoff time has expired, initiate the in-band interrupt request to the master device in response to the start condition on the serial bus.

In an embodiment, a process comprises: initiating a first in-band interrupt request by a slave device to a master device over a serial bus in response to a first start condition on the serial bus; receiving from the master device an acknowledgment of the first in-band interrupt request; resetting by the slave device of a backoff timer to store a backoff time in response to the received acknowledgement; and waiting by the slave device for the backoff time stored by the backoff timer to expire before initiating a second in-band interrupt request by the slave device to the master device over the serial bus in response to a second start condition on the serial bus.

BRIEF DESCRIPTION OF THE DRAWINGS

For the understanding of the present invention, embodiments thereof are now described, purely as a non-limitative example, with reference to the enclosed drawings, wherein.

DETAILED DESCRIPTION

Figure 1:
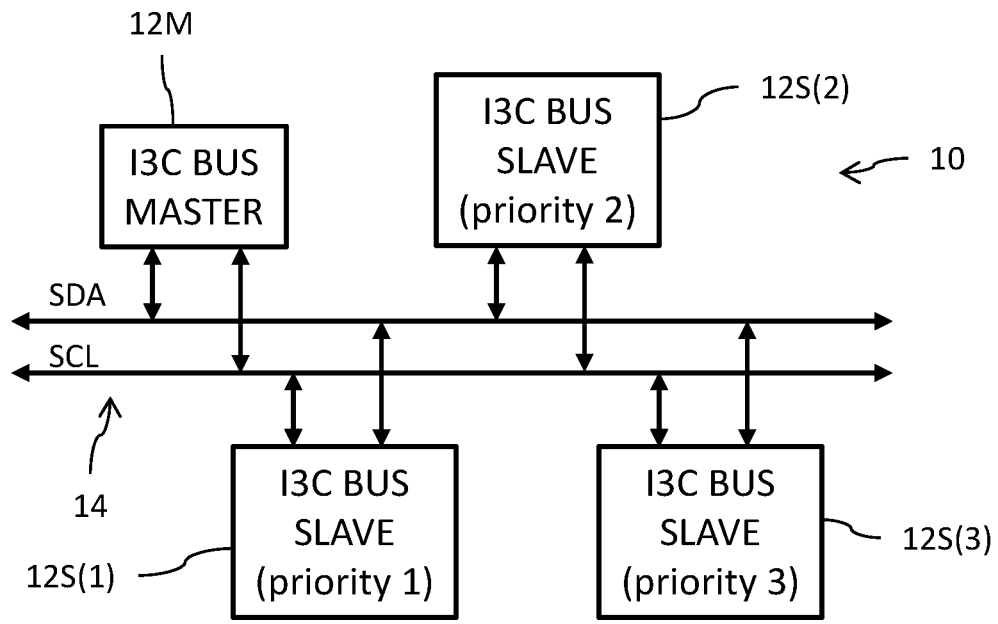
FIG. 1 is a block diagram of a bus network including a plurality of devices connected to an I3C serial bus.

Reference is now made to FIG. 1 which shows a block diagram of a bus network 10 including a plurality of devices 12 connected to an I3C serial bus 14. The serial bus 14 includes a serial data line SDA and a serial clock line SCL. Each device 12 includes a connection to the SDA and SCL lines of the serial bus 14. The devices 12 include a device 12M configured for operation as the bus master (or bus controller) and a plurality of devices 12S configured for operation as bus slaves (or bus targets). The parenthetical (_) included in the reference label for each slave device 12S indicates the priority of the slave device 12S on the serial bus 14 (wherein a slave device having a smaller numerical reference in the parenthetical has a higher assigned priority). This priority is assigned by the bus master device 12M through a bus address. In the illustrated example, slave device 12S(1) has an assigned bus address with a higher priority than the bus address assigned to slave device 12S(2), and slave device 12S(2) has an assigned bus address with a higher priority than the bus address assigned to slave device 12S(3).

The slave devices 12S may use in-band interrupts (IBI) to seek attention from the bus master device 12M. The slave devices 12S with a pending interrupt to be serviced may contend for access to the serial bus 14 by participating in a bus arbitration process. After a START condition on the serial bus 14 is satisfied (caused by a device 12M or 12S driving the SDA line logic low while the bus 14 is in the IDLE state, then followed by the master device 12M driving the SCL line logic low), the slave devices 12S competing for access may initiate an IBI request and begin simultaneously transmitting their assigned bus addresses on the SDA line. Only the slave device 12S with the lowest assigned bus address (i.e., having the highest assigned priority) will successfully communicate its bus address on the SDA line to the master device 12M. The master device 12M may then respond to the successful slave device 12S with an acknowledgement (ACK) and then service the IBI request from that slave device 12S. The unsuccessful slave devices 12S must then wait for a next START condition before initiating a new IBI request and competing for bus access.

Consider the following example in the context of the assigned priorities for the slave devices 12S as shown in FIG. 1. At time t0, slave devices 12S(1), 12S(2) and 12S(3) have interrupts that need the attention of the master device 12M. At time t1, following time to, the START condition on the serial bus 14 is satisfied. At time t2, following time t1, all three slave devices 12S(1), 12S(2) and 12S(3) begin transmitting their assigned bus addresses on the SDA line. The slave device 12S(1) has the bus address with the highest priority and only its bus address is received by the master device 12M. At time t3, following time t2, the master device 12M acknowledges the IBI request of slave device 12S(1) with an ACK message sent on the SDA line and then services the interrupt.

At time t4, following servicing of the IBI of slave device 12S(1), the START condition on the serial bus 14 is again satisfied. At time t5, following time t4, slave devices 12S(2) and 12S(3) begin transmitting their assigned bus addresses on the SDA line. The slave device 12S(2) has the bus address with the highest priority and only its bus address is received by the master device 12M. At time t6, following time t5, the master device 12M acknowledges the IBI request of slave device 12S(2) with an ACK message sent on the SDA line and then services the interrupt.

At time t7, following servicing of the IBI of slave device 12S(2), the START condition on the serial bus 14 is yet again satisfied. At time t8, following time t7, slave device 12S(3) begins transmitting its assigned bus addresses on the SDA line. The slave device 12S(3) has the bus address with the highest priority and only its bus address is received by the master device 12M. At time t9, following time t8, the master device 12M acknowledges the IBI request of slave device 12S(3) with an ACK message sent on the SDA line and then services the interrupt.

In certain cases, however, there can be continued contention at each START condition and one or more slave devices 12S having bus addresses with low assigned priority may not be able to win the bus arbitration process. This can happen, for example, in scenarios where the slave devices 12S are highly active and generate frequent IBI requests. Consider the following example in the context of the assigned priorities for the slave devices 12S as shown in FIG. 1. At time t10, slave devices 12S(1), 12S(2) and 12S(3) have interrupts that need the attention of the master device 12M. At time t11, following time t10, the START condition on the serial bus 14 is satisfied. At time t12, following time t11, all three slave devices 12S(1), 12S(2) and 12S(3) begin transmitting their assigned bus addresses on the SDA line. The slave device 12S(1) has the bus address with the highest priority and only its bus address is received by the master device 12M. At time t13, following time t12, the master device 12M acknowledges the IBI request of slave device 12S(1) with an ACK message sent on the SDA line and then services the interrupt.

At time t14, following servicing of the IBI of slave device 12S(1), the START condition on the serial bus 14 is again satisfied. In this case, however, slave device 12S(1) has another interrupt in need of master device 12M attention. At time t15, following time t14, slave devices 12S(1), 12S(2) and 12S(3) begin transmitting their assigned bus addresses on the SDA line. The slave device 12S(1) again has the bus address with the highest priority and only its bus address is received by the master device 12M. At time t16, following time t15, the master device 12M acknowledges the IBI request of slave device 12S(1) with an ACK message sent on the SDA line and then services the interrupt.

At time t17, following servicing of the IBI of slave device 12S(1), the START condition on the serial bus 14 is satisfied. At time t18, following time t17, slave devices 12S(2) and 12S(3) begin transmitting their assigned bus addresses on the SDA line. The slave device 12S(2) has the bus address with the highest priority and only its bus address is received by the master device 12M. At time t19, following time t18, the master device 12M acknowledges the IBI request of slave device 12S(2) with an ACK message sent on the SDA line and then services the interrupt.

At time t20, following servicing of the IBI of slave device 12S(2), the START condition on the serial bus 14 is yet again satisfied. In this case, however, slave device 12S(1) has yet another interrupt in need of master device 12M attention. At time t21, following time t20, slave devices 12S(1) and 12S(3) begin transmitting their assigned bus addresses on the SDA line. The slave device 12S(1) again has the bus address with the highest priority and only its bus address is received by the master device 12M. At time t22, following time t21, the master device 12M acknowledges the IBI request of slave device 12S(1) with an ACK message sent on the SDA line and then services the interrupt.

The slave device 12S(3), with its lowest assigned priority, is effectively blocked from winning the bus arbitration process due to the presence of one or more slave device 12S having a higher assigned priority with continuing access demands. The slave device 12S(3) is starved of service over the serial bus 14 and lacks any mechanism for making the master device 12M aware of its service needs.

Figure 2:
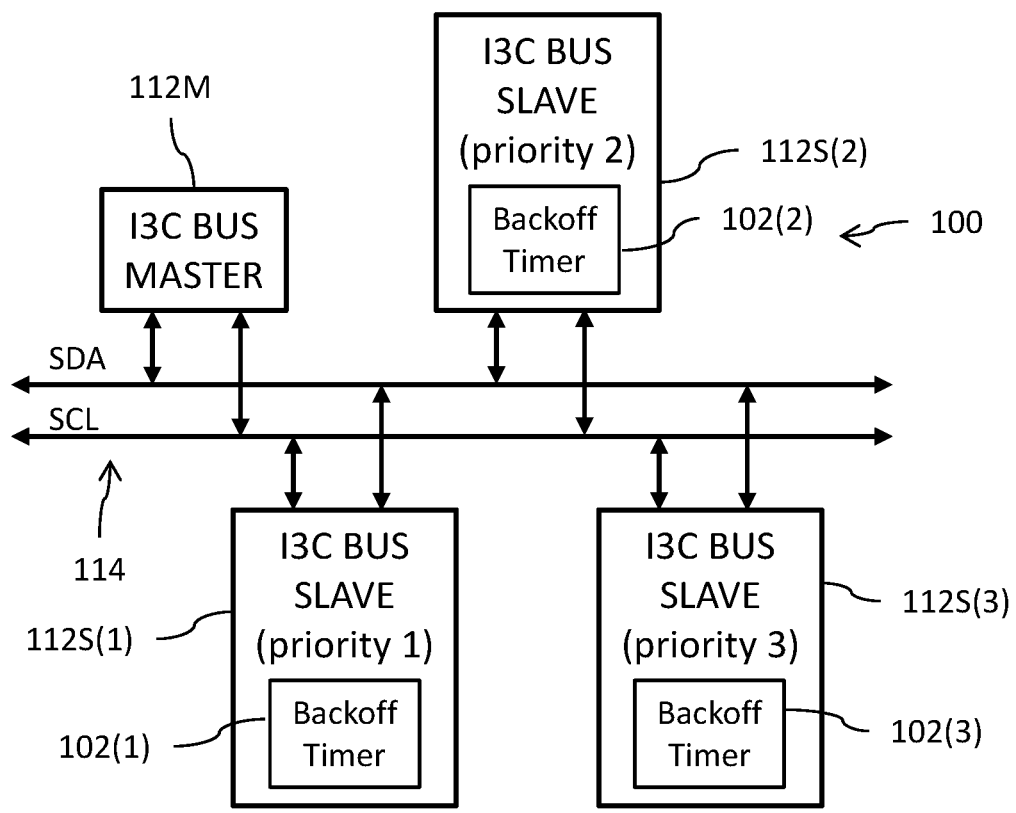
FIG. 2 is a block diagram of a bus network including a master device and slave devices with in-band interrupt (IBI) backoff timers connected to an I3C serial bus.

Reference is now made to FIG. 2 which shows a block diagram of a bus network including a master device 112M and slave devices 112S with in-band interrupt (IBI) backoff timers 102 connected to an I3C serial bus 114. The serial bus 114 includes a serial data line SDA and a serial clock line SCL. Each device 112 includes a connection to the SDA and SCL lines of the serial bus 114. The devices 112 include a device 112M configured for operation as the bus master (or bus controller) and a plurality of devices 112S configured for operation as bus slaves (or bus targets). The parenthetical (_) included in the reference label for each slave device 112S indicates the priority of the slave device 112S on the serial bus 114. This priority is assigned by the bus master device 112M through a bus address. In the illustrated example, slave device 112S(1) has an assigned bus address with a higher priority than the bus address assigned to slave device 112S(2), and slave device 112S(2) has an assigned bus address with a higher priority than the bus address assigned to slave device 112S(3).

The slave devices 112S may use in-band interrupts (IBI) to seek attention from the bus master device 112M. The slave devices 112S with a pending interrupt may contend for access to the serial bus 114 by participating in a bus arbitration process. After a START condition on the serial bus 114 is satisfied (caused by a device 112M or 112S driving the SDA line logic low while the bus 114 is in the IDLE state, then followed by the master device 112M driving the SCL line logic low), the slave devices 112S competing for access may initiate an IBI request and begin simultaneously transmitting their assigned bus addresses on the SDA line. Only the slave device 112S with the lowest assigned bus address (i.e., having the highest assigned priority) will successfully communicate its bus address of the SDA line to the master device 112M. The master device 112M may then respond to the successful slave device 112S with an acknowledgement (ACK) and then service the IBI request from that slave device 112S. The unsuccessful slave devices 112S must then wait for a next START condition before initiating a new IBI request.

The IBI backoff timer 102 in each slave device 112S stores a backoff time value (BOTIME) which indicates a delay time period that the slave device 112S must wait before it can participate in a bus arbitration process for an in-band interrupt. In response to a slave device 112S winning the bus arbitration process and being acknowledged by the master device 112M (with an acknowledgement message (ACK)), the slave device 112S will set its IBI backoff timer 102 with a backoff time value (BOTIME). In the event that the slave device 112S subsequently has an interrupt that needs to be serviced by the master device 112M, but the backoff time value is not zero (i.e., BOTIME≠0), the slave device 112S will not respond to satisfaction of the START condition on the serial bus 114 by participating in the bus arbitration process. In other words, the slave device 112S is inhibited from participating in the bus arbitration process while the backoff timer 102 stores a non-zero value. The slave device 112S will wait for expiration of backoff time when the backoff time value is equal to zero (i.e., BOTIME=0), and then respond to satisfaction of the START condition on the serial bus 114 by participating in the bus arbitration process.

In an embodiment, the backoff time value refers to a number of START conditions on the serial bus 114 which must occur after the slave device 112S wins the bus arbitration process and is acknowledged by the master device 112M before that slave device 112S can next participate in the bus arbitration process. In this case, the IBI backoff timer 102 can be implemented as a counter that is reset with the backoff time value after winning the bus arbitration process and being acknowledged by the master device 112M. The backoff time value is then decremented by one at each successive satisfaction of the START condition. When the backoff time value decrements to zero, the slave device 112S is permitted to participate in the next bus arbitration process.

Figure 3:
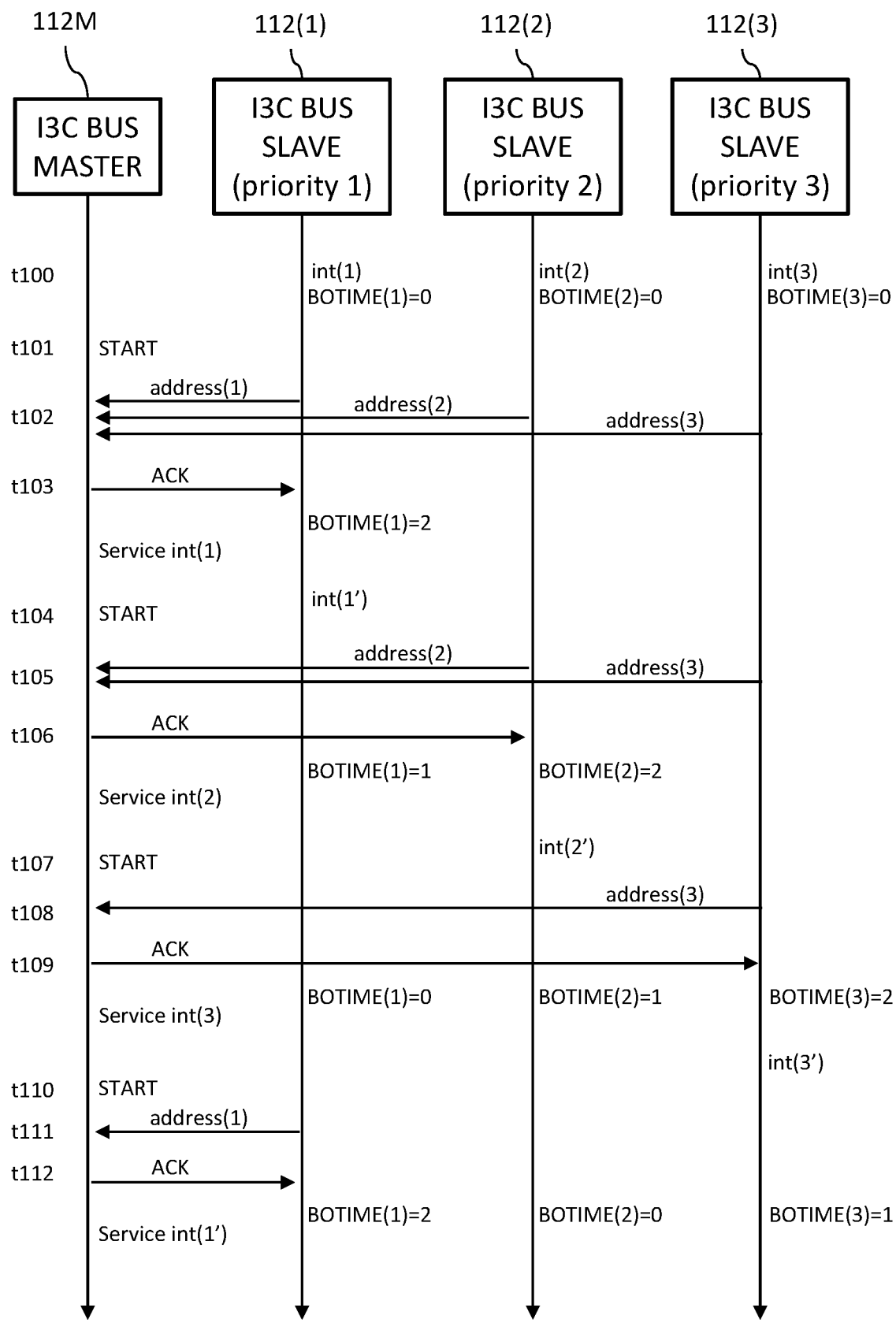
FIG. 3 is a signal ping-pong diagram illustrating operation of the bus network shown in FIG. 2.

Consider the following example in the context of the assigned priorities for the slave devices 112S as shown in FIG. 2, and as illustrated using the signal ping-pong diagram of FIG. 3. At time t100, slave devices 112S(1), 112S(2) and 112S(3) have interrupts (int(1), int(2), int(3), respectively) that need the attention of the master device 12M and the backoff timers for all slave devices have backoff time values equal to zero. At time t101, following time t100, the START condition on the serial bus 104 is satisfied. At time t102, following time t101, all three slave devices 102S(1), 102S(2) and 102S(3) begin transmitting their assigned bus addresses (address(1), address(2), address(3), respectively) on the SDA line. The slave device 102S(1) has the bus address (address(1)) with the highest priority and only its bus address is received by the master device 102M. At time t103, following time t102, the master device 112M acknowledges the IBI request of slave device 112S(1) with an ACK message sent on the SDA line and then services the interrupt. In response to receipt of the ACK message, the slave device 112S(1) resets the backoff time value stored in timer 102(1) to a maximum value equal, for example, to two (i.e., BOTIME(1)=2).

At time t104, following servicing of the IBI of slave device 112S(1), the START condition on the serial bus 114 is satisfied. At this time, slave device 112S(1) has another interrupt (int(1')) in need of master device 112M attention, and the interrupts int(2) and int(3) of slave devices 112S(2) and 112S(3) remain outstanding. However, because the backoff time value stored in timer 102(1) of device 112S(1) is not equal to zero, the device 112S(1) refrains from participating in the bus arbitration process in response to the START condition. At time t105, following time t104, slave devices 112S(2) and 112S(3)—with backoff time values both equal to zero—begin transmitting their assigned bus addresses (address(2), address(3), respectively) on the SDA line. The slave device 112S(2) has the bus address (address(2)) with the highest priority and only its bus address is received by the master device 112M. At time t106, following time t105, the master device 112M acknowledges the IBI request of slave device 112S(2) with an ACK message sent on the SDA line and then services the interrupt. In response to receipt of the ACK message, the slave device 112S(2) resets the backoff time value stored in timer 102(2) to a maximum value equal, for example, to two (i.e., BOTIME(2)=2). Also, the slave device 112S(1) will decrement by one the backoff time value stored in timer 102(1) to a value equal to one (i.e., BOTIME(1)=1).

At time t107, following servicing of the IBI of slave device 112S(2), the START condition on the serial bus 114 is satisfied. At this time, slave device 112S(2) has another interrupt (int(2')) in need of master device 112M attention, and the interrupts int(3) and int(1') of slave devices 112S(3) and 112S(1) remain outstanding. However, because the backoff time values stored in the timer 102(1) of slave device 112S(1) and the timer 102(2) of slave device 112S(2) are not equal to zero, the devices 112S(1) and 112S(2) are inhibited from participating in the bus arbitration process in response to the START condition. At time t108, following time t107, slave device 112S(3) begins transmitting its assigned bus address on the SDA line. The slave device 112S(3) has the bus address with the highest priority and only its bus address is received by the master device 112M. At time t109, following time t108, the master device 112M acknowledges the IBI request of slave device 112S(3) with an ACK message sent on the SDA line and then services the interrupt. In response to receipt of the ACK message, the slave device 112S(3) resets the backoff time value stored in timer 102(3) to a maximum value equal, for example, to two (i.e., BOTIME(3)=2). Also, the slave device 112S(1) will decrement by one the backoff time value stored in timer 102(1) to equal zero (i.e., BOTIME(1)=0) and the slave device 112S(2) will decrement by one the backoff time value stored in timer 102(2) to equal one (i.e., BOTIME(2)=1).

Thus, notwithstanding the pending interrupts (int(1'), int(2')) of slave devices 112S(1) and 112S(2) time t107 with higher priority, the interrupt of slave device 112S(3) is serviced by the master device 112M. Slave device 112S(3) is not starved of service.

At time t110, following servicing of the IBI of slave device 112S(3), the START condition on the serial bus 114 is yet again satisfied. At this time, slave device 112S(3) has another interrupt (int(3')) in need of master device 112M attention, and the interrupts int(1') and int(2') of slave devices 112S(1) and 112S(2) remain outstanding. However, because the backoff time values stored in the timer 102(2) of slave device 112S(2) and the timer 102(3) of slave device 112S(3) are not equal to zero, the slave devices 112S(2) and 112S(3) are blocked from participating in the bus arbitration process. The time value stored in the timer 102(1) of slave device 112S(1), however, has decremented to zero and device 112S(1) is now permitted to participate in the bus arbitration process. At time t111, following time t110, slave device 112S(1) begins transmitting its assigned bus address on the SDA line. The slave device 112S(1) has the bus address with the highest priority and only its bus address is received by the master device 112M. At time t112, following time t111, the master device 112M acknowledges the IBI request of slave device 112S(1) with an ACK message sent on the SDA line and then services the interrupt. In response to the ACK message, the slave device 112S(1) resets the backoff time value stored in timer 102(1) to a maximum value equal, for example, to two (i.e., BOTIME(1)=2). Also, the slave device 112S(2) will decrement by one the backoff time value stored in timer 102(2) to equal zero (i.e., BOTIME(1)=0) and the slave device 112S(3) will decrement by one the backoff time value stored in timer 102(3) to equal one (i.e., BOTIME(3)=1).

It will be noted that in the event that a given slave device 112S has its bus address received by the master device 112M, but the master device 112M does not acknowledge the IBI request of device 112S and sends a no acknowledgement (NACK) message on the SDA line, the slave device 112S will not then reset the backoff time value stored in timer 102 to the maximum value. In this way, that slave device 112S would remain permitted to participate in the next bus arbitration process.

Figure 4:
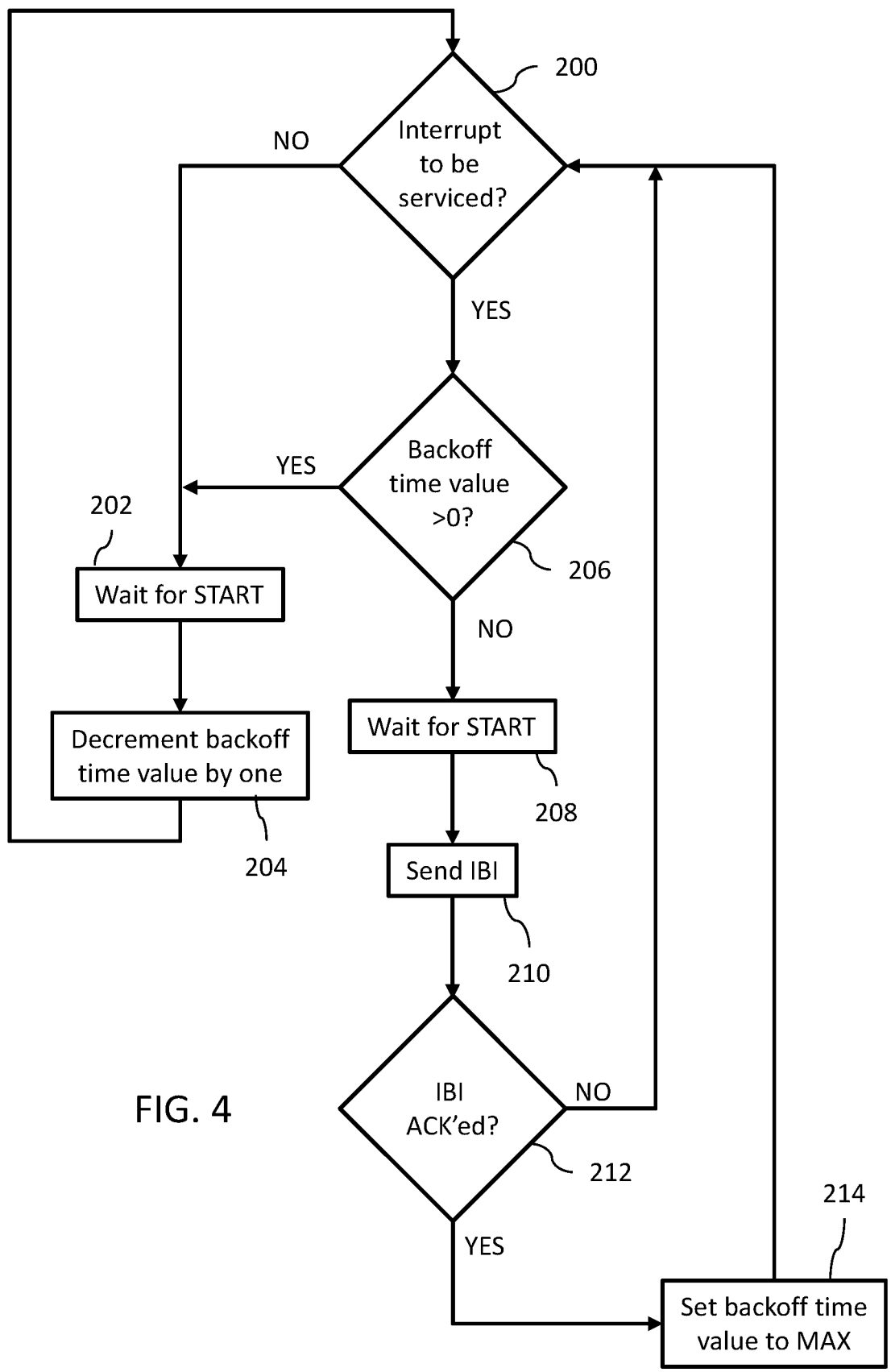
FIG. 4 is a flow diagram illustrating slave device operation.

Reference is now made to FIG. 4 which illustrates a flow diagram for slave device 112S operation. In step 200, the slave device 112S determines whether it has an interrupt to be serviced. If no in step 200, the device 112S determines in step 202 that a START condition on the serial bus 114 has been satisfied, and then decrements the backoff time value by one in step 204. The process then returns to step 200 and repeats.

If yes in step 200, the slave device 112S determines in step 206 whether the backoff time value is greater than zero. If yes in step 206, the process moves to step 202. Note, in this processing path the slave device 112S is inhibited and does not participate in the bus arbitration process by initiating an in-band interrupt.

If no in step 206, the slave device 112S determines in step 208 that a START condition on the serial bus 114 has been satisfied, and then participates in the bus arbitration process in step 210 by initiating an in-band interrupt request. For example, the slave device responds to the START condition by transmitting the bits of its assigned address.

In step 212, the slave device 112S determines whether the master device 112M has acknowledged the IBI request with an ACK message. If no in step 212, the process then returns to step 200 and repeats. Note here that no resetting of the backoff timer 102 is made. If yes in step 212, the backoff time value stored in timer 102 is reset to a maximum value, and the process then returns to step 200 and repeats.

In an embodiment, the maximum value of the backoff timer is a fixed value for each slave device 112S that is set for each device on the bus 114 during programming. In this context, all slave devices 112S on a given bus 114 can be assigned to use the same maximum value. Alternatively, slave devices 112S on the bus 114 can be assigned to use different maximum values. In such a case, there may be an advantage for a slave device 112S having a lower assigned priority to also be assigned use of a smaller maximum value for the backoff timer 102. In another embodiment, the maximum value of the backoff timer is dynamically set by the master device 112M and programmed into each slave device 112S on the bus 114 by the master device 112M (for example, based on a number of devices 112S that are connected to the bus).

It will also be noted that for one or more devices 112S on the bus 114 which require highest priority (for example, unrestricted) access, the maximum value of the backoff timer for those devices 112S can be set to a very low number or even to zero.

The solution described herein provides a number of advantages: a) maintains a lower pin count for the device master 112M; b) fully supports the in-band interrupt procedure defined by I3C protocols and standards; c) enables lower priority slave devices 112S to participate in the in-band interrupt procedure by ensuring opportunity to access the bus; d) provides the advantage of lower latency to the I3C bus which implements the in-band interrupt procedure; e) supports low power and low overhead communication on the I3C bus; f) presents a solution to bus congestion problems that might otherwise have necessitated a bus splitting for the sake of bus scheduling, especially in the context of real time operating systems (RTOS); g) implemented with minimal overhead on the system as the devices 112S essentially manage themselves.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The invention claimed is:

1. A process for a slave device on a serial data bus to make an in-band interrupt request to a master device, comprising:
    storing a backoff time in a backoff timer of the slave device, said backoff time specifying a delay following master device servicing of a first in-band interrupt request that the slave device must wait before initiating a second in-band interrupt request;
    checking whether the backoff time stored by the backoff timer has expired;
    when the backoff time has not expired, refraining from initiating the second in-band interrupt request to the master device in response to a start condition on the serial data bus; and
    when the backoff time has expired, permitting initiating the second in-band interrupt request to the master device in response to the start condition on the serial data bus.

2. The process of claim 1, wherein storing comprises, in response to acknowledgement by the master device on the serial data bus of the first in-band interrupt request, resetting the backoff time stored by the backoff timer to a maximum value.

3. The process of claim 2, further comprising, when the backoff time has not expired:
    in response to the start condition on the serial data bus, decrementing the backoff time stored by the backoff timer and continuing to refrain from initiating the second in-band interrupt request to the master device.

4. The process of claim 3, wherein decrementing the backoff time comprises decrementing by one in response to each subsequent start condition on the serial data bus.

5. The process of claim 3, wherein the backoff time is expired when the backoff time is decremented to zero.

6. The process of claim 2, wherein the maximum value is set by the master device.

7. The process of claim 2, wherein the maximum value is set in view of a bus access priority level assigned to the slave device.

8. The process of claim 1, wherein the start condition on the serial data bus indicates start of a bus arbitration process for multiple slave devices to request attention by the master device on the serial data bus.

9. A slave device configured for communication with a master device over a serial data bus, comprising:
    a backoff timer configured to store a backoff time, said backoff time specifying a delay following master device servicing of one in-band interrupt request that the slave device must wait before initiating a subsequent in-band interrupt request;

wherein the slave device is further configured to:
  check whether the backoff time stored by the backoff timer has expired;
  when the backoff time has not expired, refrain from initiating the subsequent in-band interrupt request to the master device in response to a start condition on the serial data bus; and
  when the backoff time has expired, initiate the subsequent in-band interrupt request to the master device in response to the start condition on the serial data bus.

10. The slave device of claim 9, further configured to:
reset the backoff time stored by the backoff timer to a maximum value in response to acknowledgement by the master device on the serial data bus of said one in-band interrupt request.

11. The slave device of claim 10, further configured, when the backoff time has not expired, to:
  decrement the backoff time stored by the backoff timer in response to the start condition on the serial data bus; and
  continue to refrain from initiating the subsequent in-band interrupt request to the master device.

12. The slave device of claim 11, wherein the backoff time is expired when the backoff time is decremented to zero.

13. The slave device of claim 11, further configured to decrement the backoff time by one in response to each subsequent start condition on the serial data bus.

14. The slave device of claim 10, wherein the maximum value is set by the master device.

15. The slave device of claim 10, wherein the maximum value is set in view of a bus access priority level assigned to the slave device.

16. The slave device of claim 9, wherein the start condition on the serial data bus indicates start of a bus arbitration process for multiple slave devices to request attention by the master device on the serial data bus.

17. A process, comprising:
  initiating a first in-band interrupt request by a slave device to a master device over a serial data bus in response to a first start condition on the serial data bus;
  receiving from the master device an acknowledgment of the first in-band interrupt request;
  resetting by the slave device of a backoff timer to store a backoff time in response to the received acknowledgement;
  wherein said backoff time specifies a delay following the acknowledgment of the first in-band interrupt request that the slave device must wait before initiating a second in-band interrupt request; and
  waiting by the slave device for the backoff time stored by the backoff timer to expire before initiating a second in-band interrupt request by the slave device to the master device over the serial data bus in response to a second start condition on the serial data bus.

18. The process of claim 17, wherein the delay specified by the backoff time is a number of start conditions on the serial data bus which occur after the first start condition and before the second start condition.

19. The process of claim 18, wherein resetting comprises setting the backoff time to a maximum value for the number of start conditions and wherein waiting comprises decrementing the backoff time by one in response to each start condition on the serial data bus which occurs after the first start condition.

20. The process of claim 19, wherein the maximum value is set by the master device.

21. The process of claim 19, wherein the maximum value is set in view of a bus access priority level assigned to the slave device.

22. The process of claim 17, wherein the start condition on the serial data bus indicates start of a bus arbitration process for multiple slave devices to request attention by the master device on the serial data bus.

\* \* \* \* \*